United States Patent [19]
Braess et al.

[11] 3,892,284
[45] July 1, 1975

[54] WHEEL SUSPENSION FOR MOTOR VEHICLES

[75] Inventors: Hans-Hermann Braess, Stuttgart-Stammheim; Rudolf Kronewitter, Boblingen, both of Germany

[73] Assignee: Dr. Ing. h.c.F. Porsche, AG, Germany

[22] Filed: Jan. 4, 1973

[21] Appl. No.: 320,907

[30] Foreign Application Priority Data
Jan. 5, 1972   Germany............................ 2200351

[52] U.S. Cl. ........ 180/73 D; 280/96.2 R; 280/124 A
[51] Int. Cl. ............................................ B60k 17/32
[58] Field of Search............ 180/73, 43 R; 280/96.2; 267/63

[56]         References Cited
            UNITED STATES PATENTS

| | | | |
|---|---|---|---|
| 2,305,795 | 12/1942 | Schieferstein...................... | 280/96.2 |
| 2,996,311 | 8/1961 | Thiry ................................... | 267/63 |
| 3,237,962 | 3/1966 | Kraus et al......................... | 280/96.2 |
| 3,467,406 | 9/1969 | Henry-Biabaud.................... | 267/63 |

FOREIGN PATENTS OR APPLICATIONS

| | | | |
|---|---|---|---|
| 1,226,432 | 10/1966 | Germany | |
| 868,116 | 2/1953 | Germany ........................... | 280/96.2 |

*Primary Examiner*—Robert J. Spar
*Assistant Examiner*—Ross Weaver
*Attorney, Agent, or Firm*—Craig & Antonelli

[57]            ABSTRACT

A wheel suspension for motor vehicles which includes a wheel guide member retained at the body or at the frame of the vehicle and a wheel carrier pivotally connected to the wheel guide member by the interposition of elastic elements; the elastic elements between the wheel guide member and the wheel carrier are thereby so arranged and/or constructed that the wheel steering-pole of the elastic wheel movement—as viewed in plan view—assumes a position in which the wheel is substantially non-adjustable or is adjustable only in the direction of a toe-in under the influence of forces acting on the wheel.

25 Claims, 5 Drawing Figures

WHEEL SUSPENSION FOR MOTOR VEHICLES

The present invention relates to a wheel suspension for motor vehicles with a wheel guide member retained at the body or at the frame and with a wheel carrier pivotally connected to the wheel guide member under interposition of elastic elements.

Elastic elements, for the most part, rubber elements, are used for preventing the transmission of noises and vibrations from tires rolling along the road surface onto the vehicle body and into the interior space. However, partial systems capable of vibrations result therefrom which, primarily when they possess a large mass, in turn can again considerably lessen the driving comfort with low frequency vibrations. Consequently, with the use of the elastic elements in the wheel suspension, a compromise between noise insulation and the magnitude of the force vibrations or oscillations reacting on the suspension has to be sought.

However, elastic elements, especially rubber elements, can additionally serve therebeyond the purpose to permit a far-reachingly free movement of the points of pivotal connection.

The aforementioned requirements can be harmonized only with great difficulties with the requirements, self-evident with wheel suspensions in motor vehicles, for as precise as possible and therewith necessarily a hard guidance of the wheel guide members for the prevention of changes in the wheel position. Consequently, also in that connection a compromise has to be sought again.

Accordingly, it is proposed in the German Pat. No. 1,226,432 (63c-38/02) to construct the bearing support of the wheel guide member constructed as inclined guide member at the frame or body in the two bearings provided therefor of different yieldingness. The bearing support near the wheel is thereby to be constructed hard and the bearing support remote from the wheel considerably more yielding. This, however, leads to the fact that, on the one hand, vibrations and oscillations can be transmitted precisely by way of the hard bearing support located near the wheel whereas, on the other, a wheel position change in the direction of a toe-out (wheel on the outside of the curve) takes place in the presence of lateral guide forces to be absorbed in curves by the wheel. This, however, is undesirable because an "over-steering effect" is caused by this self-steering behavior.

The German Offenlegungsschrift 1,455,650 (63c-38/02) discloses a damping device for wheel suspensions comprising a damping block of elastic material interconnected between a wheel guide member and a wheel carrier. With a soft construction of such a block, the latter is effective in a disadvantageous manner on the wheel guidance whereas with a hard construction thereof, it cannot fully develop the damping effect contemplated for the same.

The present invention is concerned with the task of improving by a corresponding construction of the wheel suspension the self-steering behavior of a motor vehicle both during a curve drive and also during a load change, and thereby ensuring simultaneously, a good noise insulation and absorption of vibrations when the wheels roll off of the road surface. Additionally, the wheel guide members, properly speaking, should not undergo any changes, if possible, in order, on the one hand, to render the present invention applicable in principle to every type of wheel suspension and, on the other, not to have to accept any desired restriction as regards the matching of the wheel suspension to other required properties.

The underlying problems are solved according to the present invention with a wheel suspension having a wheel guide member retained at the body or at the frame and with a wheel carrier pivotally connected thereat under interposition of elastic elements in that the elastic elements between the wheel guide member and the wheel carrier are so arranged and/or constructed that the instantaneous pole of the elastic wheel movement, as viewed in plan view and in relation to the pivotal connection of a wheel (to be referred to hereinafter as wheel steering-pole), assumes a position in which the wheel is non-adjustable or is adjustable only in the direction of toe-in under the effect of forces acting thereon.

The optimum solution is found when the wheel steering pole lies to the rear of the vertical wheel center cross plane and outside the wheel track.

A solution offers certain advantages, in which the elastic elements connecting the wheel carrier with the wheel guide member are provided on both sides of the vertical wheel center cross plane whereby the product, formed by the associated spring stiffness or hardness and by the associated effective distance of the elastic elements to the vertical wheel center cross plane is larger at the elements disposed to the rear of the vertical wheel center cross plane—as viewed in the driving direction—than with the elements disposed in front thereof. Three elastic elements may thereby connect the wheel carrier with the wheel guide member whereby one elastic element each is arranged on each side of the vertical wheel center cross plane. These two elements should lie in or above, respectively, or below the horizontal wheel center cross plane whereas the third element is to be respectively arranged below or above the same.

The elastic elements may preferably be constructed as rubber bearings which may be supported on fastening elements arranged at the wheel carrier. The rubber bearings and/or the fastening elements should thereby be so arranged and/or constructed that an optimum matching is attainable as regards wheel guidance and vibration insulation. This, of course, is individually different for each motor vehicle type and can be achieved primarily by the selection of the rubber, and by the location and construction of the rubber bearings and of the fastening elements.

It is thereby appropriate to provide bolts as fastening elements for the rubber bearings whereby the axes thereof may extend predominantly in the vehicle longitudinal direction. The elastic elements should be provided preferably on the inside of a space formed by the wheel dish and the wheel rim.

The self-steering behavior of a motor vehicle can be improved by the construction of a wheel suspension according to the present invention. Depending on arrangement and matching, the wheel on the outside of the curve no longer carries out only any wheel position change or is able to carry out a large wheel position change in the direction of toe-in under the effect of the lateral guide forces acting on the same. An "understeering effect" which is nearly always desirable can be achieved thereby which means easier control of the vehicle. Similarly, circumferential forces acting on the wheel, especially during the load change, may effect a steering-in of the wheel with a corresponding construction of the wheel guidance according to the present invention and therewith a stabilization of the straight driving. The elastic members and/or the fastening elements thereof may be so arranged and/or constructed that the vibrations and noises stemming from the wheel—and indirectly from the road surface—can be absorbed. Especially with the use of so-called belted or radial tires, the longitudinal spring means can be constructed relatively soft for the reduction of the rolling-off hardness inherent in these tires (which is noticeable predominantly in longitudinal vibrations) whereas the camber angle spring means may be constructed relatively hard. For this reason, the rubber bearings should be arranged axially approximately in the vehicle longitudinal direction because rubber is relatively soft under shear loading or shear stresses whereas it is relatively hard under compression loading or compression stresses. Since additionally the spring characteristics of a rubber bearing proceed strongly progressively, both the translatory as also the rotatory movements of the wheel carrier (for example, as a result of the braking moment) are limited to small paths or travels whereby, however, a sufficient damping is also assured by the specific properties of rubber.

In addition to the elastic elements between wheel carrier and wheel guide member, of course the otherwise customary elastic pivotal connection of the wheel guide member at the body or at the frame is to be maintained. This corresponds as regards the oscillation or vibration insulation to a series-connection of two vibration filters whereby a high degree of insulation is attainable and the possibility of matching to two frequency ranges exists.

These and further objects, features and advantages of the present invention will become more apparent from the following description when taken in connection with the accompanying drawing which shows, for purposes of illustration only, several embodiments in accordance with the present invention, and wherein.

Figure 1:
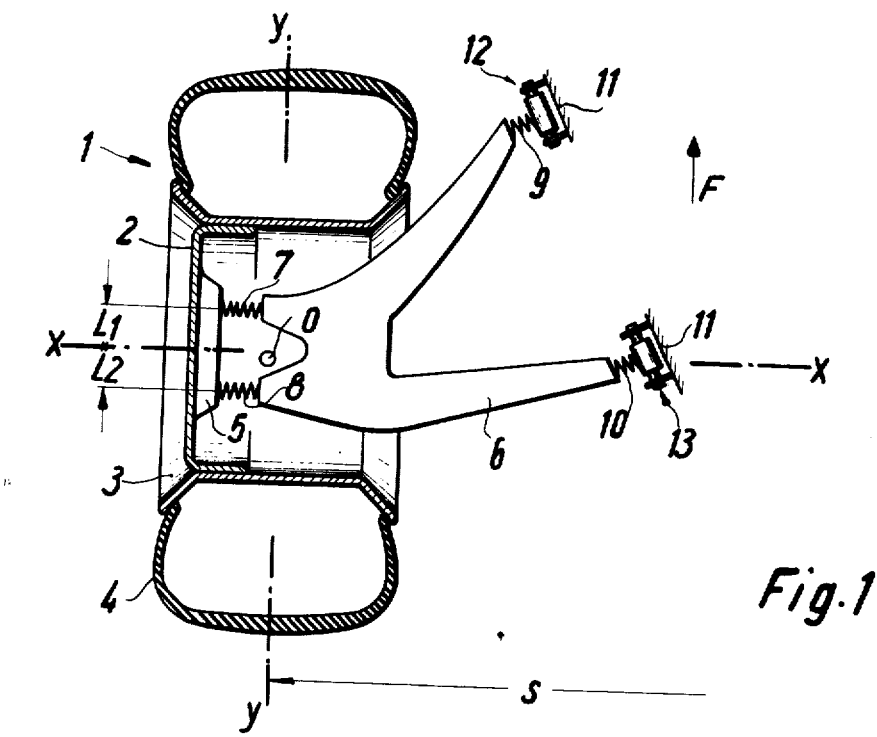
FIG. 1 is a schematic plan view of a wheel suspension according to the present invention.

Referring now to the drawing wherein like reference numerals are used throughout the various views to designate like parts, and more particularly to FIG. 1, reference numeral 1 generally designates therein a wheel, for example, the rear wheel of a motor vehicle which includes a wheel dish 2, a wheel rim 3 and a tire 4. The wheel 1 is secured at a wheel carrier 5 by way of the wheel dish 2. Elastic elements 7 and 8 are interconnected between the wheel carrier 5 and a wheel guide member 6, in this case, a triangular wheel guide member. The wheel guide member 6 is pivotally connected by way of further elastic elements 9 and 10 in pivot bearings 12 and 13 retained at the body or frame (schematically indicated by reference numeral 11) by conventional means. For the purpose of a stable pivotal connection of the wheel 1, two elastic elements may be provided above the horizontal wheel center cross plane and two elastic elements below the horizontal wheel center cross plane. The vertical wheel center cross plane is indicated by the line X—X. The wheel center longitudinal plane is indicated by line Y—Y. The arrow F indicates the driving direction. The position of the wheel steering pole of the elastic wheel movement, as viewed in plan view, is indicated by O.

The elastic elements 7 and 8 are so arranged and/or constructed that the product formed by the associated spring stiffness (at element 7:$c_1$ and at element 8 : $c_2$) and the effective distance $L_1$ and $L_2$ between elements 7 and 8, respectively, and the vertical wheel center cross plane X—X is larger at the element 8 than at the element 7. Since the elastic elements 7 and 8, by a corresponding construction of wheel rim 3, wheel dish 2, wheel carrier 5 and wheel guide element 6, are arranged outside of the wheel track (designated by reference character $s$), i.e., in FIG. 1 to the left of the wheel center longitudinal plane Y—Y, the wheel steering pole O of the elastic wheel movement in plan view establishes itself to the rear of the vertical wheel center cross plane X—X and outside of the wheel track $s$. As a result thereof, the wheel is able to adjust itself under force influences (curve, load change) in the direction of toe-in.

Figure 2:
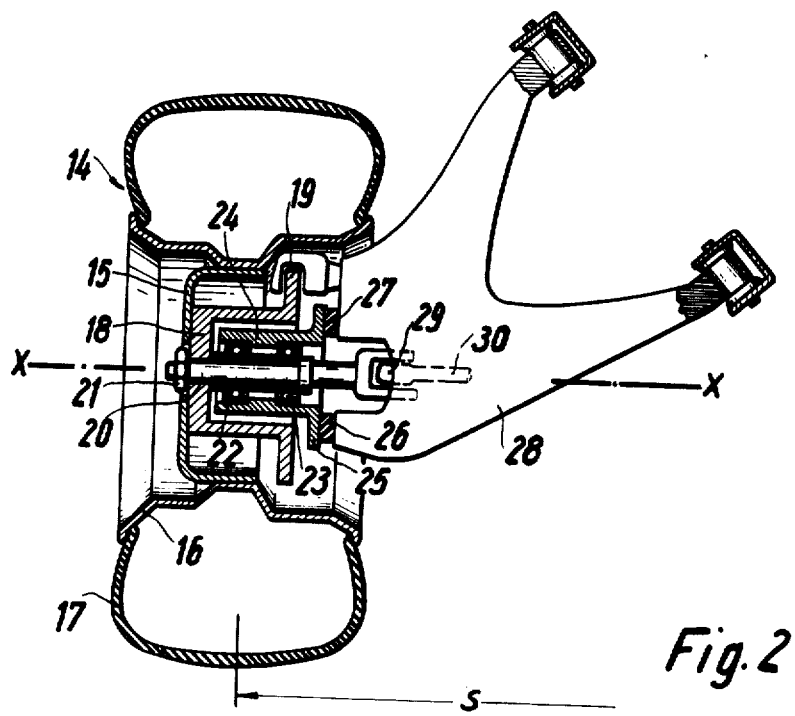
FIG. 2 is a plan view, similar to FIG. 1, of a wheel suspension according to the present invention with a different position of the wheel steering pole.

A simplified illustration of a constructively possible solution is indicated in FIG. 2. A wheel generally designated by reference numeral 14 includes again a wheel dish 15, a wheel rim 16 and a tire 17. The wheel 14 is detachably connected by way of the wheel dish 15 with a hub 18 at which a brake dish 19 is formed in one piece therewith. The hub 18 is supported in a splined shaft profile on a wheel bearing support shaft 20 and is clamped thereat and secured by a nut 21. Roller bearings 22 and 23 are also mounted on the wheel support shaft 20. The roller bearings 22 and 23 are held fast with the outer faces thereof in a bearing housing 24. The bearing housing 24 carries rubber bearings 26 and 27 at a flange 25. These rubber bearings 26 and 27 represent the connection between the wheel carrier (consisting of bearing housing 24, roller bearings 22 and 23, wheel bearing shaft 20 and hub 18) and a wheel guide member 28.

The bearing support of the wheel guide member 28 at the body or frame of the motor vehicle is solved in a manner similar to that of FIG. 1.

The wheel support shaft 20 is connected by way of a joint 29 with a wheel drive shaft 30 (non-steerable, driven wheel). The operation is corresponding to that already described by reference to FIG. 1. However, in this case, the wheel steering pole will not establish itself outside the track $s$. Nevertheless, a wheel position change in the direction of toe-in will result under forces acting on the wheel with a corresponding construction of the rubber bearings 26 and 27 since the wheel steering pole moves to the rear of the vertical wheel center cross plane X—X.

Figure 3:
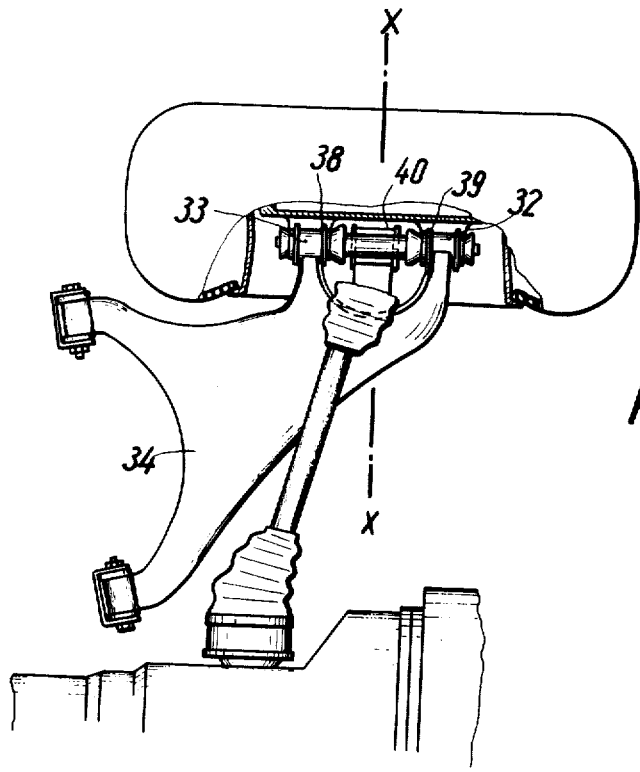
FIG. 3 is a plan view of still another embodiment of a wheel suspension according to the present invention.
Figure 4:
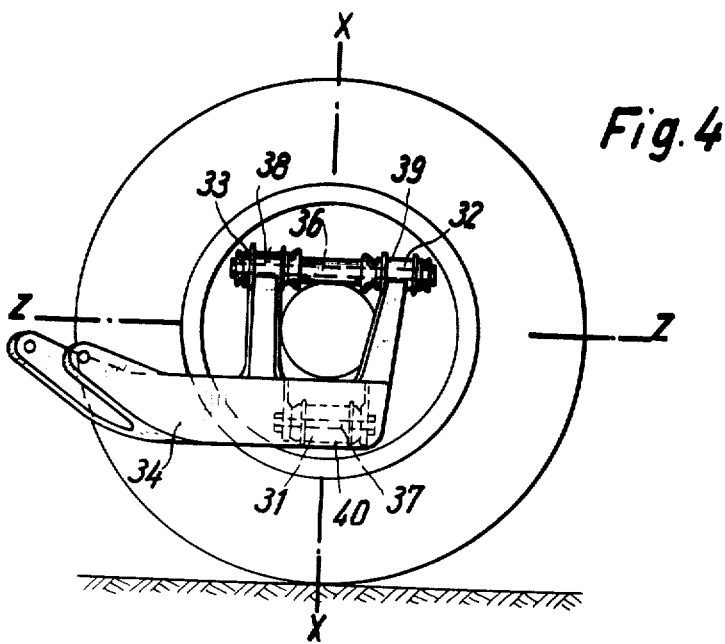
FIG. 4 is a side elevational view of the embodiment of the wheel suspension illustrated in FIG. 3.
Figure 5:
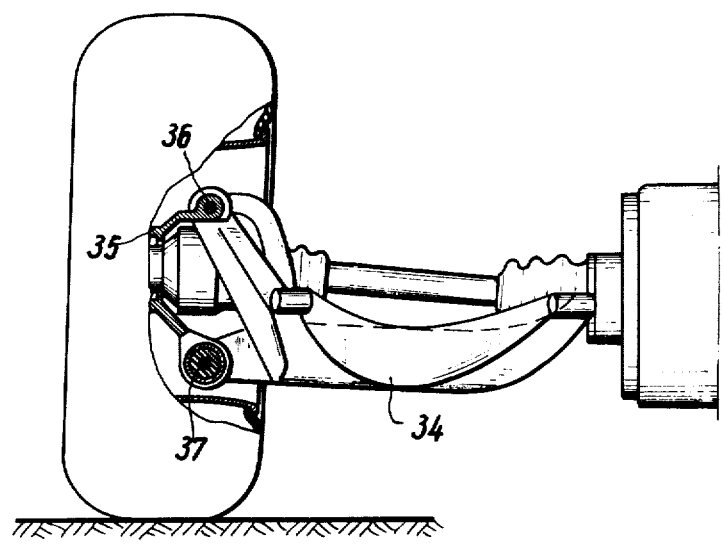
FIG. 5 is an end elevational view of the wheel suspension according to the present invention illustrated in FIGS. 3 and 4.

FIGS. 3, 4 and 5 illustrate a practical application for a wheel suspension according to the present invention. It thereby involves a solution for a rear engine vehicle with driven rear wheels and three elastic rubber bearings (31, 32 and 33) between wheel guide member 34 and a wheel carrier 35. The rubber bearings 31 and 32 and 33 are mounted or seated, on the one hand, on bolts 36 and 37 pivotally connected at the wheel carrier 35, which extend predominantly in the vehicle longitudinal direction, and are surrounded, on the other, by bearings 38, 39 and 40 connected with the wheel guide member 34. Whereas the rubber bearing 33 is arranged in front of and the rubber bearing 32 to the rear of the vertical wheel center cross plane X—X and whereas the rubber bearings 33 and 32 are arranged above the horizontal wheel center cross plane Z—Z (FIG. 4), the third rubber bearing 31 is disposed below the horizontal wheel center cross plane Z—Z. The rubber bearing 31 takes over essentially stabilizing tasks for the position of the wheel whereas the self-steering movements under force effect are effected by the construction and arrangement of the rubber bearings 32 and 33. All further elements in conjunction with this construction of a wheel suspension are arranged and constructed in a known manner and therefore are not described herein.

The tasks and manner of operation of this embodiment are also corresponding to what has already been described hereinabove in connection with the embodiment of FIG. 1.

The matching of the elastic elements necessary according to the present invention can take place either by selection of the material, by thickness of the material or by change of the distances $L_1$ and/or $L_2$. A change of the inherent properties of the wheel suspension can also be achieved by a change in position (inclination) of the fastening elements (bolts 36 and 37). If the wheel brake is to be arranged located on the inside (for example, at the differential) or if the wheel guide member is constructed as guide rectangle with correspondingly selected steering pole, a wheel suspension can be realized according to the present invention which is able to fulfill all required properties in an optimum manner.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A wheel suspension for a vehicle comprising:
   wheel guide means retained at a relatively fixed one of a vehicle body having a longitudinal direction and a vehicle frame,
   wheel carrier means for rotatably supporting a vehicle wheel in use,
   plural elastic support means interconnecting said wheel carrier means and said wheel guide means, at least two of said elastic support means being, respectively, of different elasticities and arranged in such a manner as to yield a wheel steering moment pole of elastic wheel movement which is located so as to permit only toe-in wheel adjustment in response to forces acting on the wheel in use.

2. A wheel suspension according to claim 1, wherein the wheel steering moment pole is located outside the wheel track in use and to the rear of a vertical plane extending through the center of the wheel in use and substantially parallel to the vehicle body longitudinal direction.

3. A wheel suspension according to claim 1, wherein the elastic support means connecting the wheel carrier means with the wheel guide means are located at least one rearwardly and at least one forwardly of a vertical plane extending transversely through the center of the wheel in use and arranged in such a manner that the product formed by the associated relative elasticity and the effective distance from said vertical plane of the elastic support means located rearwardly of said vertical plane is larger than the corresponding product of the forwardly located elastic support means.

4. A wheel suspension according to claim 3, wherein the elastic support means include three elastic elements which connect the wheel carrier means with the wheel guide means with one elastic element arranged on each side of said vertical plane.

5. A wheel suspension according to claim 4, wherein the elastic elements provided on each side of said vertical plane are arranged in a horizontal plane extending through the center of the wheel in use.

6. A wheel suspension according to claim 4, wherein the elastic elements provided on each side of said vertical plane are arranged above a horizontal plane extending through the center of the wheel in use.

7. A wheel suspension according to claim 6, wherein the third elastic element is arranged below said horizontal plane.

8. A wheel suspension according to claim 5, wherein the third elastic element is arranged below said horizontal plane.

9. A wheel suspension according to claim 4, wherein the elastic elements provided on each side of said vertical plane are arranged below a horizontal plane extending through the center of the wheel.

10. A wheel suspension according to claim 9, wherein the third elastic element is arranged above said horizontal plane.

11. A wheel suspension according to claim 1, wherein said elastic support means comprise rubber bearing means.

12. A wheel suspension according to claim 11, wherein said rubber bearing means are supported on fastening means arranged at the wheel carrier means.

13. A wheel suspension according to claim 12, wherein at least one of the rubber bearing means and at least one of the fastening means are so arranged and constructed that an optimum matching is attainable as regards wheel guidance and vibration insulation.

14. A wheel suspension according to claim 13, wherein said fastening means comprise bolts for supporting the rubber bearing means.

15. A wheel suspension according to claim 14, wherein the axes of said bolts extend predominantly in the longitudinal direction defined by the vehicle body.

16. A wheel suspension according to claim 15, wherein a wheel dish and a wheel rim are provided and are arranged to form a space, said elastic support means being arranged within said space.

17. A wheel suspension according to claim 16, wherein the elastic support means connecting the wheel carrier means with the wheel guide means are located at least one rearwardly and at least one forwardly of a vertical plane extending transversely through the center of the wheel in use and arranged in such a manner that the product formed by the associated relative elasticity and the effective distance from said vertical plane of the elastic support means located rearwardly of said vertical plane is larger than the corresponding product of the forwardly located elastic support means.

18. A wheel suspension according to claim 17, wherein the elastic support means include three elastic elements which connect the wheel carrier means with the wheel guide means with one elastic element arranged on each side of said vertical plane.

19. A wheel suspension according to claim 18, wherein the elastic elements provided on each side of said vertical plane are arranged in a horizontal plane extending through the center of the wheel in use.

20. A wheel suspension according to claim 19, wherein the elastic elements provided on each side of said vertical plane are arranged above a horizontal plane extending through the center of the wheel in use.

21. A wheel suspension according to claim 20, wherein the third elastic element is arranged below said horizontal plane.

22. A wheel suspension according to claim 18, wherein the elastic elements provided on each side of said vertical plane are arranged below a horizontal plane extending through the center of the wheel.

23. A wheel suspension according to claim 22, wherein the third elastic element is arranged above said horizontal plane.

24. A wheel suspension according to claim 23, wherein the wheel steering moment pole is located outside the wheel track in use and to the rear of a vertical plane extending through the center of the wheel in use and substantially parallel to the vehicle body longitudinal direction.

25. A wheel suspension according to claim 1, wherein a wheel dish and a wheel rim are provided and are arranged to form a space, said elastic support means being arranged within said space.

* * * * *